Dec. 24, 1935.　　　G. C. BEIDLER　　　2,025,371
APPARATUS FOR TREATING PHOTOGRAPHIC FILM
Filed Oct. 12, 1933　　　3 Sheets-Sheet 1
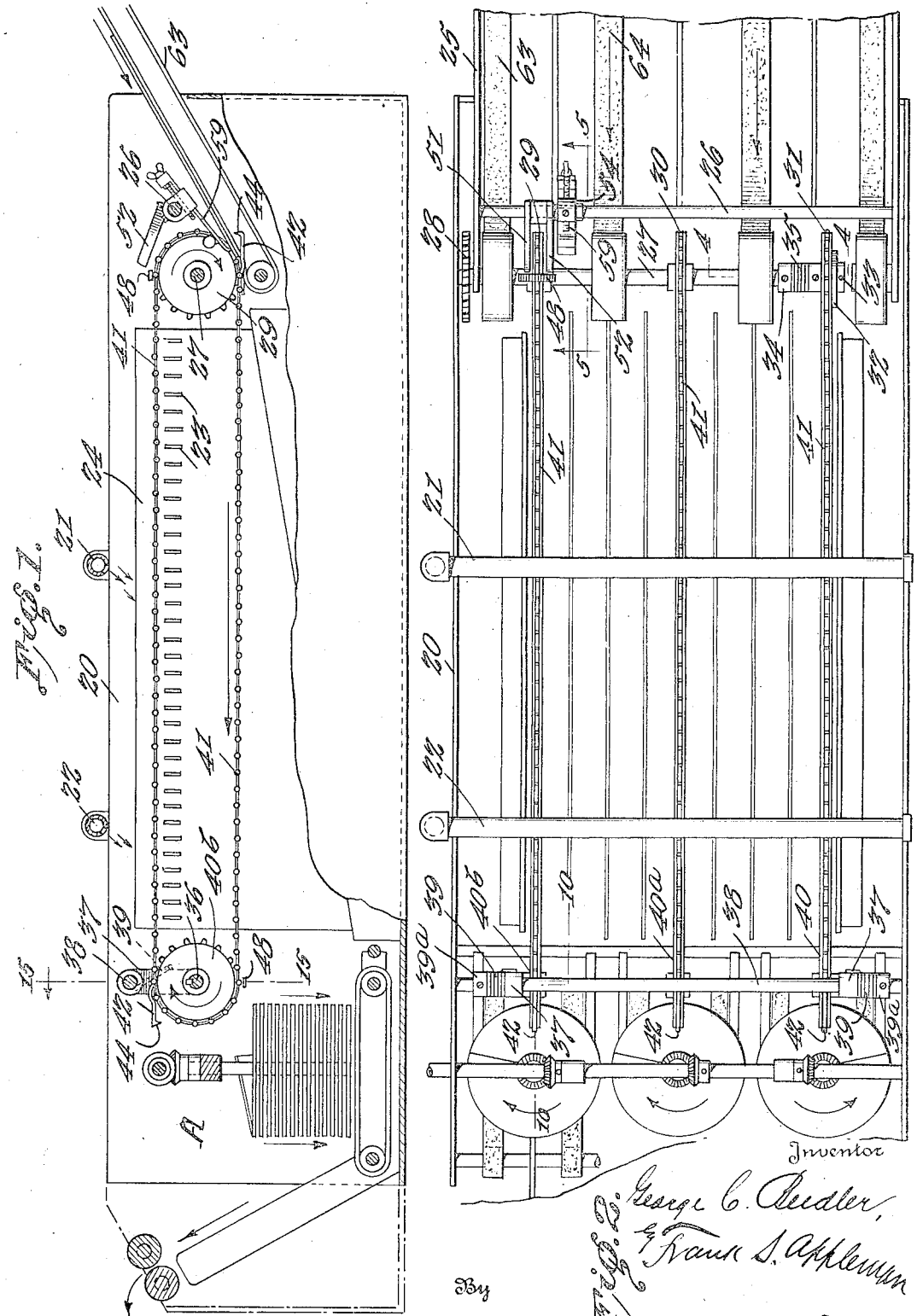

Dec. 24, 1935.  G. C. BEIDLER  2,025,371
APPARATUS FOR TREATING PHOTOGRAPHIC FILM
Filed Oct. 12, 1933  3 Sheets—Sheet 2
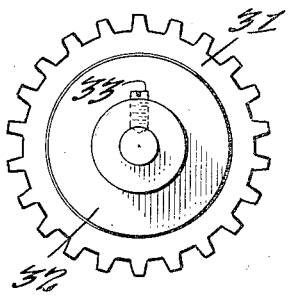
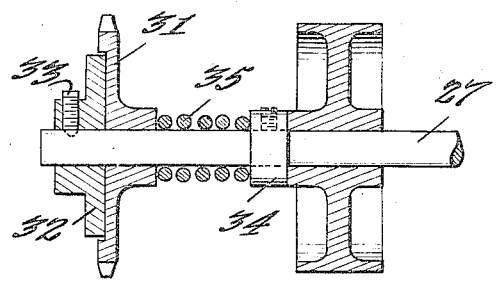
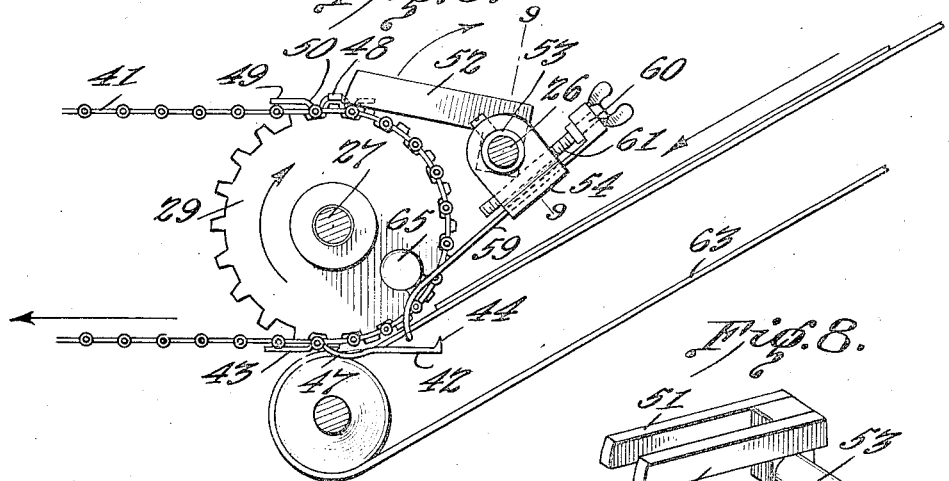
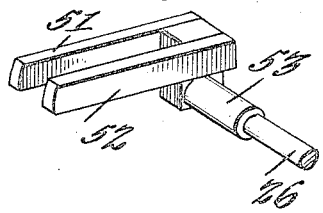
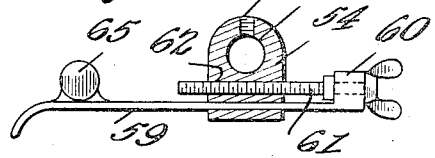
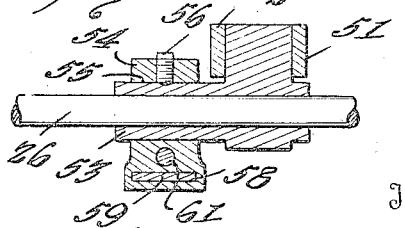
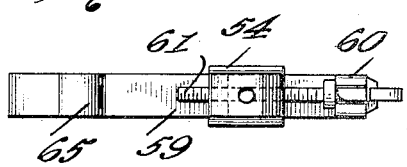
Inventor
George C. Beidler,
By Frank S. Appleman,
Attorney.

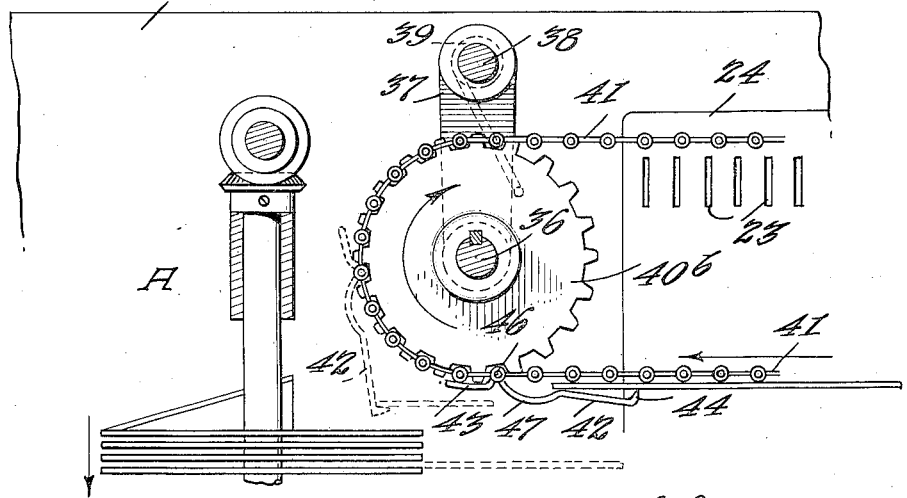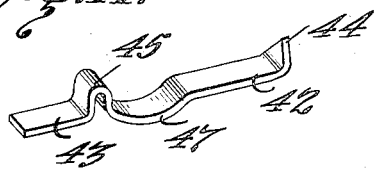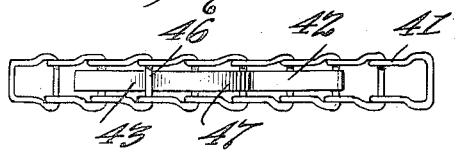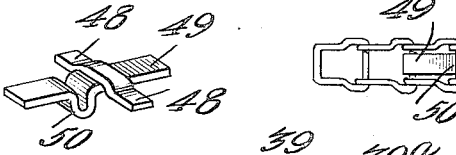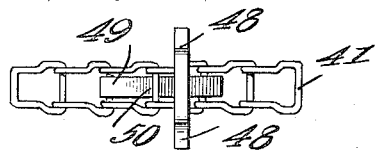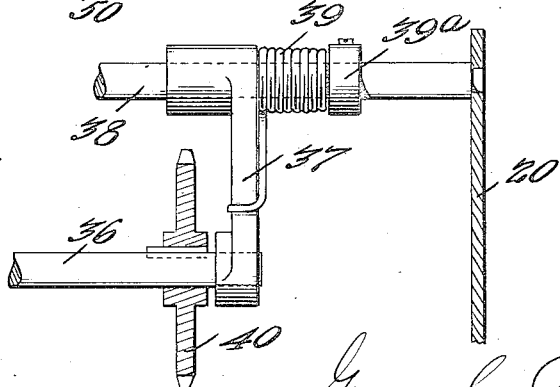

Patented Dec. 24, 1935

2,025,371

UNITED STATES PATENT OFFICE 2,025,371

APPARATUS FOR TREATING PHOTOGRAPHIC FILM

George C. Beidler, Rochester, N. Y.

Application October 12, 1933, Serial No. 693,350

5 Claims. (Cl. 271—79)

This invention relates to apparatus for treating photographic film after it has been exposed to light and in process of being finished, such as when it is being subjected to the action of fluids during the finishing process.

It is an object of this invention to transfer film from one receptacle to another and to move the film in a receptacle to a predetermined position and release it when it is properly positioned in the receptacle. It is well known that films used in commercial photography have a paper base which, while being developed, fixed, and washed, becomes flimsy and easily wrinkled or crumpled. It is an object of this invention to provide means, as stated, for moving the film, and this invention includes means for positively gripping the film near one end and drawing it into a receptacle containing fluid; means being also provided for releasing the film at a predetermined location in the receptacle. While the invention is shown and will be described in association with a washing tank or receptacle, it is obvious that the instrumentalities may be likewise employed in transferring the film in other receptacles such as the fixing bath, and the invention is furthermore susceptible of use in a wide range of activities as will hereinafter appear.

It is the purpose of the inventor primarily to provide a film transferring means which may be used in connection with apparatus for carrying film downwardly in a receptacle, which is associated with means for removing film from the receptacle after the film has been carried downwardly step by step in the fluid of the receptacle. To this end, the invention is shown as associated with submerging instrumentalities forming a portion of the subject matter of United States Letters Patent No. 1,768,501 dated June 24, 1930, and the invention is furthermore shown as associated with film delivering means by which film is delivered to the carrier of this invention, which delivering means is likewise more fully shown in the aforesaid patent.

The present invention has novel means by which the advancing end of the film when delivered is impinged by instrumentalities which positively hold the advanced end of the film on a conveyer while it is being drawn into the receptacle and to a location where it is to be released, the said device being operative to move the instrumentalities to withdraw the impinging portion thereof from the film, the action being positive in character.

It is a further object of this invention to provide means for holding the conveyer inoperative intermittently and to provide novel means whereby the advancing film as it comes into the zone of action of the grippers operates a trip which releases the conveyer and permits the transmission of power from its proper source to mechanism which operates the conveyer, it being understood that when the film disengages the tripping mechanism, it assumes its normal position and the conveyer is again arrested with the grippers positioned to receive the succeeding film.

With the foregoing and other objects in view, the invention consists in the details of construction, and in the arrangement and combination of parts to be hereinafter more fully set forth and claimed.

In describing the invention in detail, reference will be had to the accompanying drawings, forming part of this application, wherein like characters denote corresponding parts in the several views, and in which—

Figure 1 illustrates a sectional view of a receptacle including a conveyer, embodying one form of the invention;

Figure 2 illustrates a plan view of the receptacle and conveyer;

Figure 3 illustrates an end view of the assembly shown in Figure 4;

Figure 4 illustrates a sectional view of one end of a driven shaft and a clutch and other parts associated therewith;

Figure 5 illustrates an enlarged detail view of a film delivering means in association with a conveyer;

Figure 6 illustrates a view in side elevation of one portion of the trip means, partly in section;

Figure 7 illustrates a top plan view thereof;

Figure 8 illustrates a perspective view of the conveyer arresting arm associated with a shaft on which it is mounted;

Figure 9 illustrates a sectional view of the tripper assembly;

Figure 10 illustrates an enlarged sectional view of one end of the conveyer with the submerger in relation thereto;

Figure 11 illustrates a perspective view of one form of gripper;

Figure 12 illustrates a plan view of a portion of the conveyer, showing the gripper in place;

Figure 13 illustrates a perspective view of one of the conveyer arresting elements;

Figure 14 illustrates a top plan view thereof associated with a conveyor chain; and Figure 15 illustrates a detail view of a conveyer tensioning means.

In these drawings, 20 denotes a receptacle or tank which is intended, in the present embodiment, for washing film, and it is provided with water delivery pipes 21 and 22 and water delivering orifices 23, a plurality of which is supplied in each side wall 24 of the tank.

Side plates or frame elements 25 extend into the tank and are connected by a rod 26. A shaft 27 is journaled transversely of the receptacle and is driven from any suitable source of power through a sprocket wheel 28, and the said shaft is so driven uninterruptedly during the operation of the machine. At the end of the shaft remote from the sprocket wheel and intermediately thereof, sprocket wheels 29, 30 and 31 are loosely mounted on the shaft so that the shaft may rotate independently of them. The sprocket wheel 31 forms one element of a clutch whereas another element 32 of the clutch is secured on the shaft by a fastening 33 such as a screw or the like.

A collar 34, rigidly attached to the shaft 27, is abutted by a spring 35, which spring also abuts the hub of the sprocket wheel 31 by which means the clutch members are frictionally retained in engagement so that the sprocket wheel 31 will be driven by the shaft 27. The action between the members of the clutch is comparatively mild and it is the purpose of the inventor that the shaft may rotate independently of the sprocket wheel 31 without requiring any great amount of power to overcome the friction between the clutch members.

A shaft 36 is rotatable in hangers 37, each of which extends downwardly from a rod 38 near the end of the tank remote from the shaft 27, and the shaft 36 is under pressure of the spring 39 coiled on the rod 38, it being shown that one end of the spring engages one of the hangers 37 and it is the purpose of the inventor that this spring shall exert force tending to hold the shaft 36 away from the shaft 27. The spring is anchored to a collar 39ª which is fastened to the rod 38 and one end of the spring is attached to the collar.

Sprocket wheels 40, 40ª and 40ᵇ are fixed to the shaft 36 and sprocket chains 41 operate over the respective sprocket wheels of the shafts 27 and 36.

As the shaft 27 is positively driven during the operation of the machine and with the equipment so far described, the clutch members transmit the rotary motion of the shaft 27 to the sprocket wheel 31. The sprocket chain 41 on the sprocket wheel 31 engages a sprocket wheel 40 on the shaft 36 and causes the shaft 36 to be driven and with it rotates the other sprocket wheels on the shaft 36. The chains between the sprocket wheels 40ª and 40ᵇ on the shaft 36 serve to rotate the sprocket wheels 30 and 29 respectively which are free on their shaft 27, hence the conveyer, which consists of the aforesaid sprocket chains, will be operated longitudinally of the receptacle.

In the present embodiment of the invention, the gripping instrumentalities which are relied upon to positively hold the film while it is being conveyed are each formed from a strip of metal having two straight or approximately straight portions 42 and 43, the latter of which terminates in a spur 44, which stands approximately at right angles to the straight portion 43 and is operative to impinge a film, as will presently appear. The straight portion 43 is relatively short and the metal is shaped to form a loop 45 which embraces one of the cross bars 46 of a link of the chain, the said cross bar acting as a fulcrum on which the gripper oscillates. The curved portion 47 between the loop 45 and the straight portion 42 is given such a shape as to permit the straight portion 42 and the straight portion 43 to lie approximately parallel with the chain when it is in horizontal position. Of course, when the conveyer chains pass around the sprocket wheels, the gripping instrumentalities are caused to swing on the cross bar of the link and the spurs are drawn from the film, and hence the film is released. The approximately straight portion 43 may be bent to increase the force with which the spur is pressed into the film.

One of the chains, and in this illustration the chain which engages the sprocket wheels 29 and 40ᵇ, is provided with abutments which are employed for arresting the conveyer at predetermined intervals. The period during which the conveyer is arrested is during the time a film is delivered to the grippers and as the film moves into the zone of action of the grippers, the conveyer is released so that it may be driven as heretofore described. There is an abutment on the chain for each of the grippers so that when the gripper comes into position to receive a film, the conveyer is automatically arrested.

The abutments, in the present form of the invention, comprise a cross arm 48 fastened to a plate 49, which plate is bent to form a loop 50 to receive one of the cross links of the chain and when the abutment is applied to the chain, the looped portion of the plate is under the links and the two ends of the plate have their under surfaces engaging the cross bars of the adjacent links.

The abutments successively come into engagement with arms 51 and 52 that are carried by a lug on a sleeve 53 and the said sleeve is oscillatively mounted on the rod 26. A member 54 has an aperture 55 to receive an extension of the sleeve 53 and the said member is fixed on the sleeve by a set screw 56 threaded in the aperture 57. The member 54 has an aperture 58 in which a finger 59 is slidable. The finger has a lug 60 in which a screw 61 is swiveled, the said screw engaging threads in an aperture 62 of the member 54, so that by the adjustment of the screw, the finger is projected or retracted. The outer end of the finger is preferably curved downwardly and it extends between and below the upper run of the conveyer belts 63 and 64 by which the film is delivered to the grippers. When the finger is in the aforesaid position, the arms 50, 51 and 52 have their ends engaged by one of the abutments on the conveyer and by this means the wheels on the shaft 27 are held from turning and the clutch of the sprocket wheel 31 slips. When the paper, however, is carried to one of the grippers, it engages the finger and elevates it. This, in turn, elevates the arms 51 and 52 and causes them to disengage a cross arm of one of the abutments. The clutch of the sprocket wheel 31 then functions to drive the conveyer through the chains, sprocket wheels and shafts as heretofore described. When the sheet of film passes the finger, it returns to its normal position by gravity and the arms are again in the path of travel of an abutment so that when it rides to engage the arms, the movement of the conveyer temporarily ceases and remains inactive until another film acts on the finger as aforesaid. In order to insure positive operation of the arresting means, a weight 65 is applied to the finger.

The operation of the parts of the conveyer has been described in connection with the description of the elements and hence a résumé of the description of operation is believed unnecessary for an understanding of the invention by one skilled in the art.

The shaft 36 is located in such relation to a submerging unit A that when the grippers on the conveyer chains are carried around the wheels on the shaft 36, they open above the submergers and deposit the film on the top of the said submergers, and the films are then intermittently carried downwardly to a conveyer by which they are removed from the receptacle. As the submerging unit and the details of construction thereof are disclosed in the aforesaid patent and as the submerging unit per se does not form a part of the present invention, it is believed unnecessary to describe the details thereof.

The conveyer elements 41 have been referred to as "chains", but belts and pulleys may be substituted therefor.

I claim:

1. In a film treating apparatus, a driven shaft, wheels rotatable on said shaft, a shaft rotatably mounted in spaced relation to the first mentioned shaft, wheels secured to the second mentioned shaft, and alined respectively with the first mentioned wheels, clutching means for transmitting the motion of the driven shaft to one of the wheels thereon, conveyer elements engaging the wheels of the aforesaid shafts whereby the driven shaft through the aforesaid clutching means drives the other shaft and through the conveyer elements turns the freely rotatable wheels, means for arresting the conveyer elements at predetermined intervals, film gripping elements oscillatably mounted on the conveyer elements, means associated with the gripping elements for forcing the gripping elements into operative relation with the conveyer elements when the said conveyer elements are moving between the wheels, means controlled by a film moving into the zone of action of the gripping elements for releasing the conveyer elements, and means for restoring the arresting means to operative position when the film has passed a predetermined point.

2. In a film treating apparatus, a driven shaft, a shaft journaled in spaced relation to the first mentioned shaft, wheels rotatably mounted on the driven shaft, means for communicating the motion of said shaft to one of the wheels, wheels secured on the second mentioned shaft alined respectively with the first mentioned wheels, conveyer elements operating over the wheels of the driven shaft and the other shaft, film gripping elements oscillatably mounted on the conveyer elements, means associated with the gripping elements coacting with the conveyer elements for forcing the gripping elements into operative relation with the conveyer elements when said conveyer elements are moving between the wheels, the said gripping elements being oscillated as the conveyer elements pass around the wheels, means for arresting the conveyer elements and interrupting the drive between the driven shaft and the wheel moved thereby when said gripping elements are out of cooperative action with the conveyer elements, means for moving film into the space between the gripping elements and the conveyer elements, and means engaged by the film for releasing the conveyer elements when the film is in the zone of action of the gripping elements, the said gripping elements being operated to release the film when passing around the opposed wheels.

3. In a film treating apparatus, a driven shaft, a shaft journaled in spaced relation to the driven shaft, wheels rotatably mounted on the driven shaft, means for communicating the motion of the driven shaft to one of the wheels, wheels secured on the second mentioned shaft alined respectively with the first mentioned wheels, sprocket chains operating over the pairs of alined wheels, film gripping devices carried by the sprocket chains, each of said film gripping devices comprising a strip of metal having a loop to receive a cross member of a sprocket chain and having relatively straight portions on each side of the loop, one of which terminates in a spur adapted to coact with the sprocket chain for holding film and moving it while the sprocket chain is driven, the portion of the strip on the opposite side of the loop bearing against the sprocket chain and holding the spur end of the strip in operative relation to the sprocket chain, the said gripping device pivoting on the link as the portion of the sprocket chain carried by it passes around the wheels whereby the said gripping device is swung outwardly at one location for receiving film and at another location for releasing film, means for arresting the sprocket chains at predetermined positions, means for delivering film to the gripping devices, and means operated by the film for disengaging the arresting means and restoring the drive of the sprocket chains.

4. In a film treating apparatus, a conveyer for film comprising a sprocket chain, sprocket wheels on which the sprocket chain is mounted, a gripping element coacting with the sprocket chain and comprising a strip of metal having a loop to receive a cross member of the sprocket chain and relatively straight ends on each side of the loop, one of said ends terminating in a spur coacting with the sprocket chain for clamping film and the other end coacting with the sprocket chain to press the spur into engagement with film, means for impositively driving the wheels on which the sprocket chain is mounted, a cross bar on the sprocket chain, an abutment engaging the cross bar to arrest the sprocket chain, means for delivering film between the sprocket chain and the gripping element, and means operated by the film for shifting the position of the abutment and releasing the sprocket chain.

5. In a film treating apparatus, a conveyer for film comprising a sprocket chain, sprocket wheels on which the sprocket chain is mounted, a gripping element coacting with the sprocket chain and comprising a strip of metal having a loop to receive a cross member of the sprocket chain and relatively straight ends on each side of the loop, one of said ends terminating in a spur coacting with the sprocket chain for clamping film and the other end coacting with the sprocket chain to press the spur into engagement with the film, means for impositively driving the wheels on which the sprocket chain is mounted, a cross bar, means for securing the cross bar to the sprocket chain consisting in a strip of metal to which the cross bar is attached, said strip of metal having a loop to receive a cross member of the sprocket chain, the said strip engaging cross members of the sprocket chain on opposite sides of the cross member having the aforesaid loop, an abutment engaging the cross bar to arrest the sprocket chain, means for delivering film between the sprocket chain and the gripping element, and means operated by the film for shifting the position of the abutment and releasing the sprocket chain.

GEORGE C. BEIDLER.